April 18, 1950      J. E. CLARK ET AL      2,504,303
METAL TO GLASS SEALING METHOD Filed May 23, 1947      2 Sheets-Sheet 1

INVENTORS: J. E. CLARK
V. L. RONCI
BY
ATTORNEY

April 18, 1950     J. E. CLARK ET AL     2,504,303
METAL TO GLASS SEALING METHOD
Filed May 23, 1947     2 Sheets-Sheet 2

INVENTORS: J. E. CLARK
V. L. RONCI
BY
ATTORNEY

Patented Apr. 18, 1950

2,504,303

UNITED STATES PATENT OFFICE 2,504,303

METAL TO GLASS SEALING METHOD

James E. Clark, Williston Park, and Victor L. Ronci, New York, N. Y., assignors to Bell Telephone Laboratories, Incorporated, New York, N. Y., a corporation of New York Application May 23, 1947, Serial No. 750,146

6 Claims. (Cl. 250—27.5)

This invention relates to glass to metal seals and to methods of sealing thin walled members together concentrically.

In certain types of ultra-high frequency energy translating apparatus, for example high frequency oscillation generating discharge devices, the enclosing envelope, usually of low expansion glass and of tubular form, is composed of a thin walled section to reduce to a minimum the high frequency fields in the glass which endangers the glass by heating effects that may result in rupture or fracture under high voltage operation. The thin wall of the glass member presents alignment problems, in providing an efficient seal to a cooperating member or metal section which also may be of thin cross-section, due to the limited contact surfaces between the sections when aligned in butt-sealing relation. A difficulty is experienced in realizing concentricity of the cooperating members so that a uniform and symmetrical seal is produced at the conjoint surfaces of the sections.

An object of this invention is to attain concentricity in the sealing of cooperating abutting tubular members of thin walled section.

Another object of the invention is to eliminate tension strain from the coupling seal between metal and glass members of tubular form.

A further object of the invention is to facilitate the hermetic sealing of thin-walled dissimilar materials together in abutting edge-to-edge relation.

These objects are attained in accordance with the general aspects of this invention by mounting the thin walled metal and glass tubular members in coaxial relation and interposing a thicker glass ring between the juxtaposed edges thereof. The fusing of the ring while the two members are held in fixed relationship provides a sealed joint which when cooled can be removed from the sealing fixture as a unitary assembly in which coaxial relation of the members obtains. This eliminates any eccentricity in the relationship of the coaxial members regardless of the limited contact surfaces of the edges of the members and insures a tight and hermetic joint between the metal and glass members.

In a specific and illustrative embodiment of the invention, the metal and glass tubular members may have substantially the same thermal coefficients so that a strain-free seal is readily formed between them. These members are placed in a mounting fixture to align the thin edges and a precast glass ring is accurately centered between the members prior to the sealing or fusing operation. The centering feature may be readily obtained automatically by casting the ring in a precision die to provide a guide ridge in the ring which forms a seat for the metal member. When the ring is fused by suitable heating, the ring is bonded to both members simultaneously to form an annular joint of bulbous cross-section of greater thicknesses than the members.

A feature of the invention relates to a seal between metal and glass members of different thermal coefficients having thin-walled contact edges yet which can be efficiently sealed together by an interposed ring having the same thermal coefficients as the metal member to provide a limited graded seal joint between the tubular members.

These and other features of the invention will be more clearly apparent from the following description taken in connection with the accompanying drawings in which.

Figure 7:
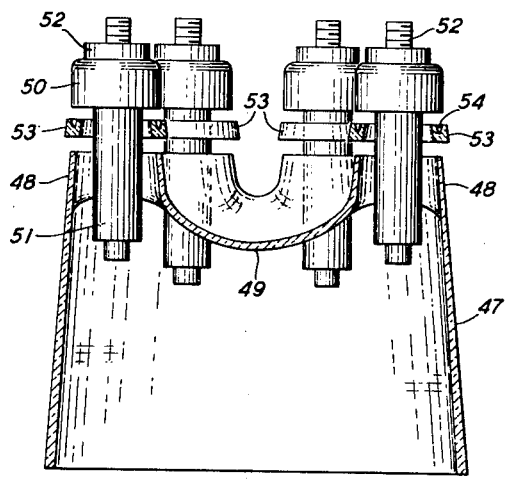
Figure 8:
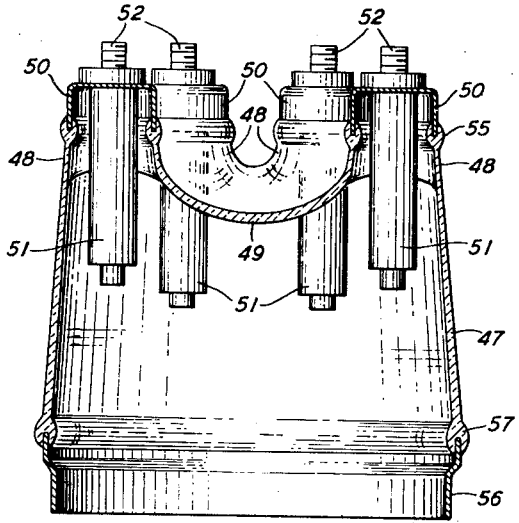

Fig. 7 is an exploded view of a multiterminal stem assembly for a power discharge device showing the relationship of the components of the metal terminals and thin walled glass stem with the separate glass rings in position between the terminals and stem; and Fig. 8 shows, in cross-section, the completed stem of Fig. 7 after the sealing operation, the stem also including a metal ring seal on the opposite end made in accordance with this invention.

Figure 1:
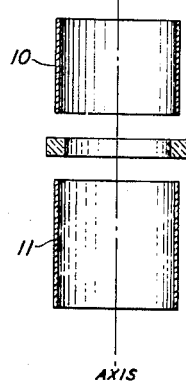
Fig. 1 is a view in section of the various elements of a seal constructed in accordance with this invention showing the coaxial relationship of the separate parts which form the components of the seal joint between metal and glass tubular members.

In the fabrication of discharge devices, particularly for ultra-high frequency power generation and of high voltage capacity, the enclosing envelope of the device may involve the utilization of glass and metal tubular sections of exceedingly thin wall dimensions to reduce to a minimum the heating effect of the high frequency fields in the glass. The metal section, for example, as shown at 10 in Fig. 1, may be a tubular thin walled member, preferably of a nickel-iron-cobalt alloy metal known commercially as "Kovar," which readily seals to a glass section or member 11 of borosilicate glass material having substantially the same thermal coefficient characteristics as the alloy. When the wall thickness of the glass section is of the order of .020 inch minimum, it is exceedingly difficult to obtain accurate coaxial relationship between the sections when sealing the metal section to the edge of the thin glass wall. This is due to the limited contact provided between the abutting edges of the sections where it is desirable to form a tight hermetic joint by fusing the glass wall to the metal section.

The difficulty of butt sealing these sections together where the glass wall is practically as thin as the metal wall may be overcome in accordance with this invention by interposing a conjunctive glass ring 12 of greater cross-section than the tubular members between them and then fusing the ring to both sections without disturbing the coaxial relationship thereof. Since the ring 12 provides a sufficient contact base of the aligned sections 10 and 11, there is no distortion of the glass section in the sealing operation and the sealed joint therebetween is expeditiously produced to form an hermetic union between the sections. The coaxial alignment of the cooperating sections of thin walled components which form part of the enclosing vessel of the device is maintained constant during the fusing operation and the resultant composite seal is structurally stronger and free from torsional or mechanical strains. The general precepts of the invention may be applied to commercial practice for production purposes in accordance with the methods and procedures shown in Figs. 2 to 5, inclusive which illustrate the various steps in producing the seal between the glass and metal tubular sections.

Figure 2:
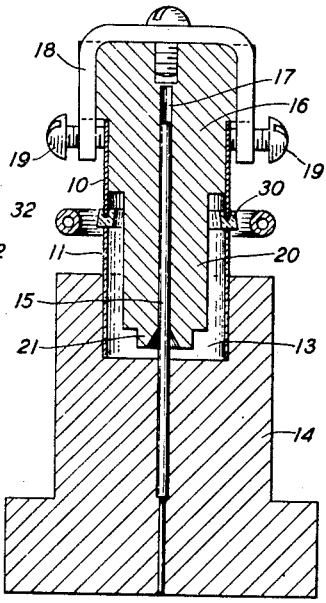
Fig. 2 shows, in cross-section, a mounting fixture for aligning the tubular components and ring in coaxial relation prior to the fusing operation.
Figure 3:
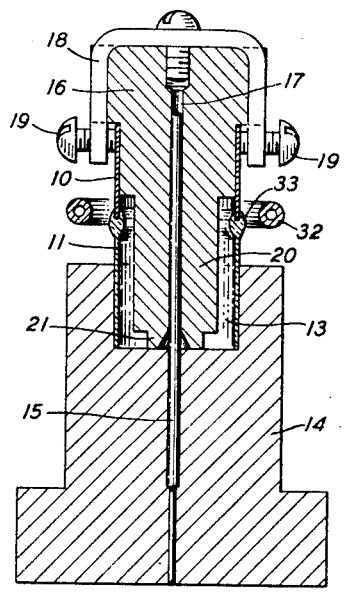
Fig. 3 is a view similar to Fig. 2 but showing the completion of the sealed joint between the tubular members.
Figure 5:
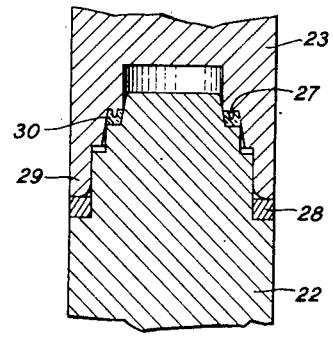
Fig. 5 shows the closed die which produces a cast ring as shown in Fig. 5A.

In Fig. 2, the glass member 11 is seated in a circular cavity 13 of a metal block or mounting fixture 14 provided with a central rod 15 which forms an aligning guide for a metal pressure head 16 having a central guide hole 17 for the rod 15. The enlarged end of the head is provided with a yoke member 18 which is rigidly attached thereto and the yoke carries clamping screws 19 to press against the surface of the metal tubular section 10 of the sealing assembly. The diameter of the contact portion of the head is the same as the internal diameter of the metal tubular section 10 to insure accurate alignment of the sections 10 and 11 in the sealing fixture. Beyond the tubular section supporting portion of the head 16 is a smaller diameter projection 20 which extends into the cavity 13 of the block 14, the length of the projection being predetermined to space the bottom end 21 from the base of the cavity.

In order to automatically center the intermediate glass ring between the sections in the sealing fixture and thereby avoid laborious and troublesome positioning of the ring in accurate coaxial relation by visual or manual manipulation, it is preferable to precast the glass ring in a desirable form to insure cooperative centering with respect to the tubular sections. This may be performed with a casting die assembly shown in Figs. 4 and 5.

Figure 4:
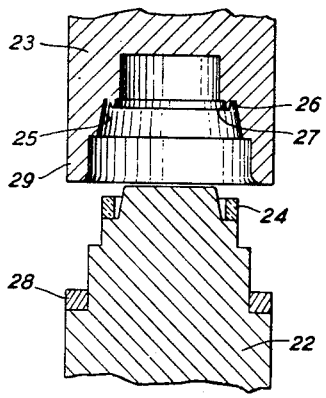
Fig. 4 shows, in cross-section, the open die for casting the glass ring shown in Fig. 4A.
Figure 4A:
Figure 5A:
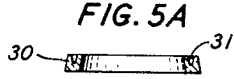

A stepped male die 22 cooperates with a stepped cavity female die 23 to mold precast a glass ring 24, shown in Fig. 4A, in a precise form, as shown in Fig. 5A. The head of the male die is beveled and the intermediate or forming cavity 25 of the enclosing die is likewise beveled to permit the removal of the cast ring from the die. The crown 26 of the beveled cavity is provided also with a concentric ridge or annular projection 27 while the bottom step of the male die has a hard steel stop ring 28 fitted thereon to limit the downward movement of the guide ring 29 of the female die during the pressure movement of the die when the glass ring 24 is in a plastic state. After the ring 24 is located on the forming step of the die 22, the die 23 is pressed over the male die and the dies are heated by any suitable medium, such as a gas flame, to render the glass ring plastic whereupon the pressure is exerted on the dies to cast the glass ring into the molding cavity of the dies. Since the glass is confined in the molding cavity by the walls of the dies and the pressure exerted forces the ridge 27 into the cast ring, the resultant cast ring 30 assumes a form as shown in Fig. 5A having beveled side walls, a flat bottom wall and a concentric groove 31 in the top surface, the cross-section of the groove being a sharp V-shape with a rounded base to provide a free centering depression for the edge of the metal tubular section 10. After the dies have cooled, the cast ring 30 is easily removed due to the beveled walls of the cavity in which it is molded.

Since the cast groove 31 is concentric in the ring 30 because of the precision casting or preforming operation, the ring will automatically center itself in the sealing fixture assembly by bringing the groove 31 into contact with the edge of the metal tubular section 10 and resting the flat bottom surface on the edge of the glass tubular section 11, as shown in Fig. 2. The glass ring will also determine the spacing of the stop projection 21 of the head from the bottom of the cavity, since this spacing is proportional to the distance between the adjacent edges of the glass section and metal section located in the groove 31 of the ring.

The fusing of the seal between the thin wall sections 10 and 11 in accurate cylindro-cylindric relation merely involves the heating, by any suitable means, of the cast ring to a plastic state to embed the edge of the section 10 in the glass mass of the ring and weld the mass to the edge of the section 11. It is advantageous, in accordance with this invention, to fuse the sealed joint by high frequency heating, as by a water-cooled coil 32 provided around the junction of the seal, to inductively raise the temperature of the sealing edge of the metal section 10 to a high degree. The heating energy is substantially expended in the vicinity of the cast ring so that the edge portion of the section 10 is raised to a bright red or yellow heat. This heating effect is concentrated near the edge by the cut-back portion of the head mounting which permits the heating energy to be localized close to the glass ring 30. While the whole metal section is heated to some extent, the heat in the upper portion is dissipated by the close contact with the large mass of metal in the head 16 and, therefore, the edge or free portion of the section 10 absorbs the greater amount of heating energy.

Since the highly heated portion is in contact with the glass ring 30, the ring is heated by conduction and rendered plastic as more and more heat is conveyed to it. Similarly, the heating energy is further conveyed to the thin edge of the tubular glass section 11. As the fusing of the glass ring 30 proceeds, the edge of the metal section 10 is forced into the plastic glass mass by the heavy mass of the head 16 and this movement is arrested when the stop portion 21 of the head rests on the base of the cavity in the block. The molten glass of the ring welds the plastic glass to the edge of the glass section 11 and also hermetically flows around the embedded edge of the metal section 10 to form a fused joint 33 of bulbous cross-section intermediate the coaxial tubular sections. When the seal is cooled to room temperature, the composite assembly may be removed from the sealing fixture and then utilized in any desirable fashion for a part of an enclosing vessel of a discharge device. For example, as shown in Fig. 6, the composite seal may be added to the enclosure assembly of a cavity resonator type high frequency discharge device.

Figure 6:
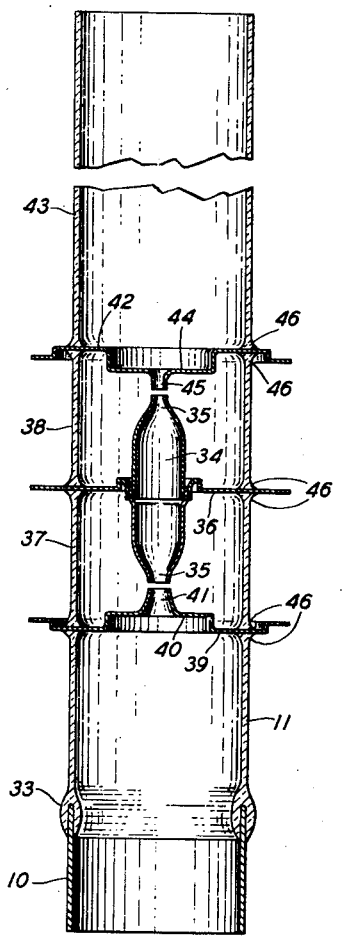
Fig. 6 is a view in section of a part of a cavity resonator type discharge device embodying a glass to metal seal constructed in accordance with this invention.

In this enclosing vessel assembly, the composite seal of this invention, shown in the lower end of the structure of Fig. 6, is coaxially related to the remaining electrodes formed as components of the vessel. An intermediate cylindrical electrode 34 having opposite ends drawn down to restricted openings 35 is supported medially by a metallic disc 36 having a diameter greater than the cylindrical glass wall members 37 and 38 disposed concentrically on opposite sides of the disc. A flanged disc 39 is also mounted between member 37 and the tubular glass section 11 and formed with a dished electrode 40 having a nozzle portion 41 directed toward the lower restricted opening 35 of the cavity electrode 34. A similar flanged disc member 42 is mounted between wall member 38 and a long tubular glass section 43 and also formed with a dished inverted electrode portion 44 having a central nozzle 45 disposed in axial relation to the adjacent restricted opening 35 in the intermediate electrode.

The wall members or sections 37, 38 and 43 advantageously are relatively thin wall cylinders similar to section 11 to reduce the heating effect of high frequency energy generated within the enclosing vessel of the device. However, the sealing of the spaced electrode group to the glass sections in relation to the metal section 10 is not difficult due to the flat contact surfaces of the discs which are sealed in abutting relation to the glass walls. When the glass sections and electrode discs are mounted in proper coaxial relation to the performed seal section including the metal tubular element 10, the butt seals 46 of the glass walls may be fused to the flat metal surfaces either simultaneously by a plurality of heating sources or successively by advancing a single heating source as each seal is completed.

The sealing methods of this invention may also be applied to a more complicated metal and glass assembly, as shown in Fig. 7. This figure discloses a multiterminal stem structure for a power generating discharge device. In this construction, a blown hollow or cup stem 47 of thin walled glass and frusto-conoidal form is provided with a plurality of tubular abutments or extensions 48 in a circular boundary around a central dished portion 49 to form a partially closed wall at the smaller diameter end of the cup stem. The cross-section of the wall of the blown stem is relatively thin, being approximately .020 inch thick. When it is desired to seal metallic cup type terminals to the thin edges of the tubular abutments and maintain accurate concentricity between the terminals and the glass walls to which they are sealed, it is evident that considerable difficulties are entailed.

The multiple terminal stem of the form shown in Fig. 7 embodies metallic terminals hermetically sealed to the stem extensions to provide rigid external terminals for the direct support of internal electrodes mounted on the glass stem. These terminals include a thin-walled cup portion 50, preferably of "Kovar" alloy, having concentrically attached to opposite sides of the closed end of the cup terminal a steel post 51 extending within the stem and a threaded stud 52 as an external connecting contact for coupling flexible conductors to the electrodes of the device.

The sealing of the thin edge of the cup terminals 50 to the thin edge of the tubular extensions 48 so that the posts 51 are concentric with respect to the cylindrical glass walls of the extensions would be a difficult operation in view of the limited contact edges of the elements involved at the point of the sealing joints. However, such seals may be accurately accomplished without distortion of the relationship of the component parts of the seals and at the same time providing hermetically sealed joints between the parts. The sealing is performed by inserting precast rings 53 with a circular groove 54 in each ring between the edges of the cup portions 50 and the tubular extensions 48. The ring 53 may be cast in accordance with the methods heretofore described in connection with Figs. 4 and 5, the location of the groove 54 being compatible with the diameter of the edge of the cup portion 50 of the terminal. When the various elements are adjusted in their aligned relation the fusing of the glass rings to both the edges of the terminal cups and the edges of the extensions is readily achieved to form a bulbous joint 55, as shown in Fig. 8, at the junction of the terminals and stem to form a unitary closed cup stem assembly.

While any suitable heating source may be utilized in fusing the glass rings, it is preferable to carry out the sealing operation by high frequency heating with all the components in stationary position. Since the multiterminal arrangement on the end of the stem is quite complicated to lend itself to ordinary fusing technique, it is more readily fabricated in accordance with the process and heating coil arrangement disclosed in a copending application, Serial No. 750,130, filed May 23, 1947, of P. R. Menzel and J. W. West. This arrangement provides uniform and simultaneous fusing of the group of seals in a single operation and insures intimate coupling between the coil and metal terminals involved in the sealing process.

In addition to the multiterminal seals on the closed end of the thin wall glass stem, the invention may also be employed in another form of metal to glass seal on the opposite end of the stem, as shown in Fig. 8. In this form, a large diameter reinforcing ring 56, preferably of Kovar, is fused to the large diameter opening of the thin wall stem by a cast glass ring which forms a bulbous joint 57 between the metal ring 56 and the stem portion 47.

The usual type of glass employed both for the stem and cast rings fir sealing to the Kovar alloy components is a borosilicate glass, known commercially as 7052 glass, obtained from Corning Glass Works, this type of glass having substantially the same thermal coefficients of expansion and contraction as the Kovar alloy. However, some applications in high frequency discharge devices may require a different type of glass for the stem to overcome excessive heating effects of a high frequency energy expended in the operation of the device. Under such circumstances a glass may be dictated, such as a low-loss borosilicate glass, commercially known as 707 glass, obtainable from Corning Glass Works. This type of glass has a coefficient of expansion in the neighborhood of $32 \times 10^{-7}$ cm./cm. °C. and cannot be directly sealed to Kovar metal parts which have a thermal coefficient of $46 \times 10^{-7}$ cm./cm./°C.

The precast glass ring method of sealing the Kovar parts to the thin walled or blown stem, in accordance with this invention, offers an efficient and durable sealed joint between the Kovar and the low-loss glass stem since the cast rings may be formed of 7052 glass which readily seals to Kovar and provides a satisfactory union with the low expansion 707 glass. The resultant seals provided by the intermediate rings form a limited graded junction between the low-loss glass stem and the higher expansion metal parts which overcome the differences in expansion of the components under temperature and efficiently secure the hermetic joint which can withstand the high frequencies and voltages encountered in high power operating devices.

While the invention has been disclosed in certain specific aspects and constructions, it is, of course, understood that various modifications may be made in the detail assemblies and methods without departing from the scope of the invention as defined in the appended claims.

What is claimed is:

1. The method of hermetically sealing tubular metal and glass members of similar thin wall cross-section together in edge to edge relation, which comprises mounting said members in aligned relation, inserting a glass ring having a groove in one end between said members, said metal member having an edge seated in said groove, heating said ring to a plastic state under continuous rotation, embedding the edge of said metal member in the plastic ring, and fusing said plastic ring to the edge of said glass member.

2. The method of hermetically sealing tubular metal and glass members of the order of .020 inch wall thickness together in edge-to-edge coaxial relation, which comprises mounting said glass member in a cavity of a centering fixture, mounting said metal member on a cylindrical head, placing a glass ring having a groove in one surface in contact with said metal member, said ring being centered by engagement of said metal member in said groove, mounting said head in concentrc relation to said fixture by a central guide common to said fixture and head, the weight of said head holding said ring against the edge of said glass member in concentric relation, heating said ring to a plastic state while continuously rotating the assembly, pressing said metal member into said plastic ring, arresting the movement of said head in relation to said fixture, and fusing said ring to the edge of said glass member.

3. The method of hermetically sealing thin walled tubular metal and glass members together in edge-to-edge relation, which comprises mounting said members coaxially in aligned relation, inserting a glass ring having a concentric groove in one end between said members, said metal member having an edge seated in said groove, heating said ring to a plastic state while rotating said members and ring in aligned relation, embedding the edge of said metal member in the plastic ring, fusing said plastic ring to the edge of said glass member, and cooling the composite assembly.

4. The method of sealing thin walled metallic cap terminals having thin edges to a blown glass stem having tubular thin walled extensions in end-to-end coaxial relation, which comprises coaxially aligning said cap terminals with said tubular extensions to bring the thin edge of each terminal into coinciding position with its respective thin edge extension, inserting precast glass rings with beveled sides and a concentric groove therein on one surface between said cap terminals and extensions, said rings having a greater cross-section than said extensions, centering said rings with respect to said terminals by locating the thin edges of said terminals in said grooves, resting the bottom surface of said rings on the thin edges of said tubular extensions, fusing said rings to a plastic state, pressing said thin edges of said terminals into said plastic rings, welding the thin edges of said extensions to said rings, and cooling the conjoint seals of said terminals, rings and extensions to form integral annular embedding beads around the edges of said cap terminals.

5. A glass to metal butt seal comprising a nickel-iron alloy sleeve member having a uniform thin wall cross-section of the order of .020 inch and having low thermal expansion characteristics but deleteriously affected by heating due to high frequency current, a tubular glass member of similar wall cross-section coaxial with said sleeve member in longitudinal relation, said glass member having low-loss characteristics with respect to high frequency current whereby heating effects are dissipated, and having dissimilar expansion characteristics with respect to said sleeve member, the adjacent seal edges of said sleeve and tubular members being too thin to provide accurate coaxiality between said members in sealing relation, and a glass seal ring portion intermediate said sleeve and tubular members, of greater thickness than said members and having thermal expansion characteristics matching said sleeve member, said sleeve member having its edge embedded in said ring portion and said tubular glass member being hermetically joined thereto.

6. A composite stem seal comprising a hollow glass member having a cylindrical body portion open at one end and a plurality of tubular extensions on the other end with a closure portion joined to said extensions, said body portion, extensions and closure portion having a wall thickness of approximately .020 inch, said glass member having low-loss characteristics with respect to high frequency current whereby heating effects are readily dissipated, a plurality of cup-shaped nickel-iron alloy terminal members coaxially aligned with the individual tubular extensions and forming a complete closure across one end of said stem, a nickel-iron alloy ring member coaxially related to the open end of said body portion, said terminal and ring members having uniform wall thicknesses substantially equal to that of said glass member but having thermal expansion characteristics differing therefrom, the adjacent edges of said terminal, ring and glass members being too thin to provide accurate coaxiality between said members in sealing relation, and conjunctive annular glass rings disposed intermediate the sealing edges of said metallic terminal and ring members and said hollow glass member, said annular glass rings having thermal expansion characteristics comparable to said metallic members and a cross-sectional area greater than said alloy terminal and ring members and said hollow glass member, the edges of said cup-shaped terminals and said alloy ring member coinciding with said annular glass rings and being embedded therein to form fused joints therebetween, and said hollow glass member being contiguously joined to said annular glass rings to form a series butt seal between said cup-shaped terminals and tubular extensions on one end and between said ring member and said open end.

JAMES E. CLARK.
VICTOR L. RONCI.

REFERENCES CITED

The following references are of record in the file of this patent:

UNITED STATES PATENTS

| Number | Name | Date |
|---|---|---|
| 1,558,524 | Winninghoff | Oct. 27, 1925 |
| 1,615,023 | McCullough | Jan. 18, 1927 |
| 1,716,140 | Kirwer | June 4, 1929 |
| 1,861,167 | Vello | May 31, 1932 |
| 1,980,840 | Wright et al. | Nov. 13, 1934 |
| 1,997,478 | White | Apr. 9, 1935 |
| 2,089,044 | Thomas | Aug. 3, 1937 |
| 2,171,234 | Freeman | Aug. 29, 1939 |
| 2,200,954 | Glassberg | May 14, 1940 |
| 2,217,421 | Scott | Oct. 8, 1940 |
| 2,379,025 | Miller | June 26, 1945 |
| 2,439,886 | Denmark et al. | Apr. 20, 1948 |